(12) United States Patent
Chien

(10) Patent No.: US 7,722,230 B2
(45) Date of Patent: May 25, 2010

(54) REMOVABLE LED LIGHT DEVICE

(76) Inventor: Tseng-Lu Chien, 8F, No. 29, Alley 73, Lin-Shen Rd., Shi-Chi Town, Taipei Hseng (TW)

( * ) Notice: Subject to any disclaimer, the term of this patent is extended or adjusted under 35 U.S.C. 154(b) by 0 days.

(21) Appl. No.: 12/149,963

(22) Filed: May 12, 2008

(65) Prior Publication Data
US 2009/0059606 A1 Mar. 5, 2009

(51) Int. Cl.
*F21V 21/00* (2006.01)

(52) U.S. Cl. .................. 362/382; 362/145; 362/276; 362/404

(58) Field of Classification Search ............. 362/145, 362/276, 382, 404
See application file for complete search history.

(56) References Cited

U.S. PATENT DOCUMENTS
2003/0179578 A1* 9/2003 Albert et al. ............. 362/276
* cited by examiner

*Primary Examiner*—Sandra L O'Shea
*Assistant Examiner*—Meghan K Dunwiddie
(74) *Attorney, Agent, or Firm*—Bacon & Thomas, PLLC

(57) ABSTRACT

A removable LED track light device has a plurality of LED light-units that fit within track means. At least one LED element(s) fits within the LED light-unit's geometric construction such that electrodes of the LED light unit are connected via conductive mean, resilient conductive means, contact means, to bus means that supply electric signal from an AC or DC power source, with circuit means, switch means, sensor means, timer means, and/or control means being included to provide desired light functions for illumination. The LED-units have a geometric construction and space to allow element(s) to be fixed in position or incorporated with reflector means. The LED light-units may also be incorporated bracket means to arrange the LED element assembly away from the LED light-unit base. Hanging means or another electric device also can be added onto the LED light-unit or LED light device to provide even more practical extra functions.

16 Claims, 6 Drawing Sheets

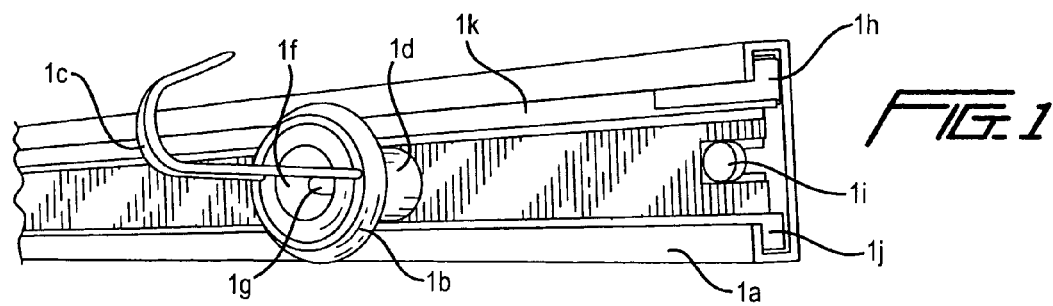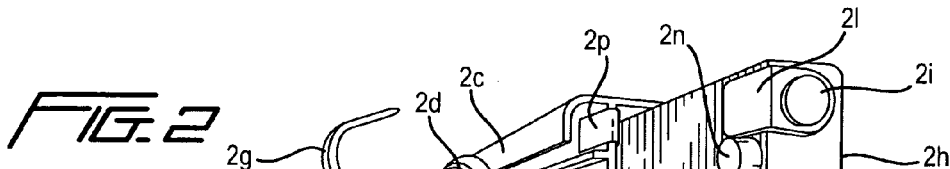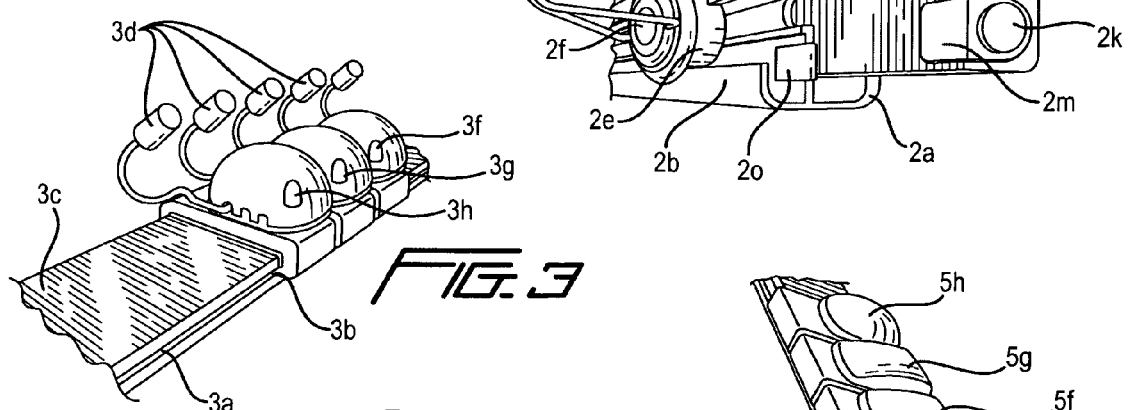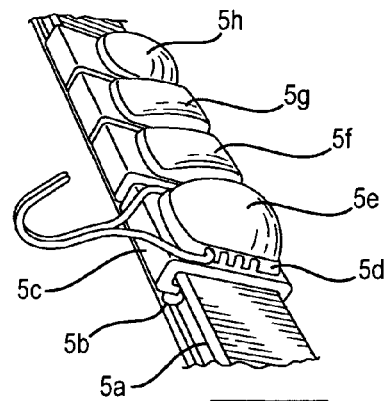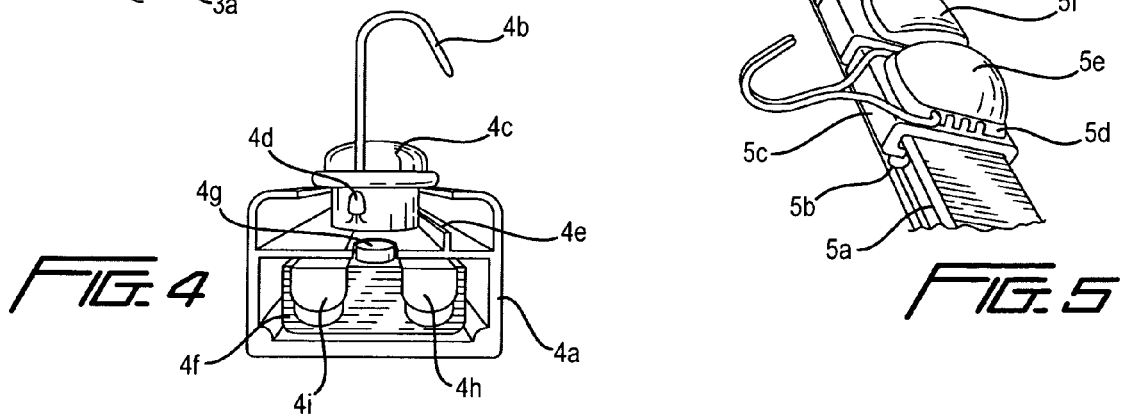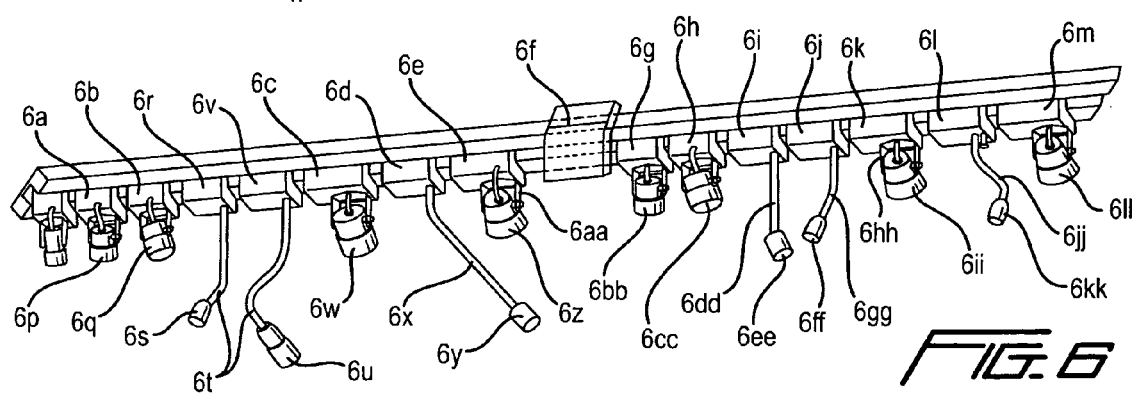

Geometric Shape

Heart Shape

Dome Shape

Dome Shape

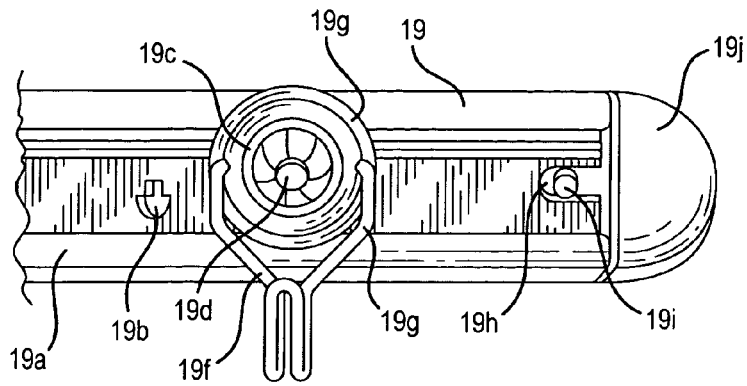
FIG.19
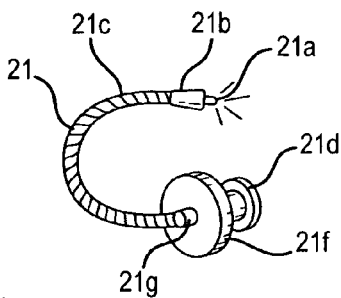
FIG.21
FIG.22
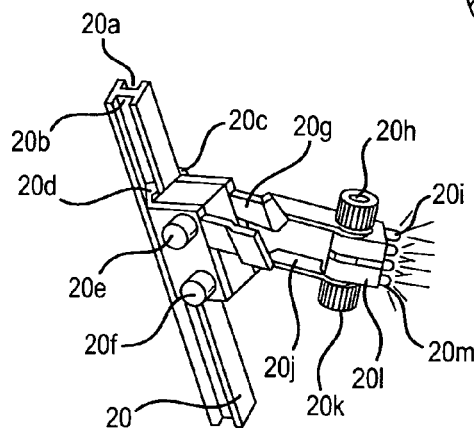
minuature size: Track only 10 x 10mm
FIG.20
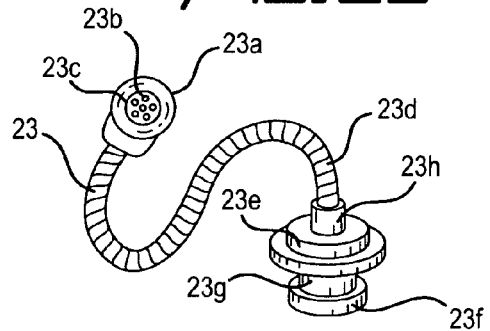
FIG.23
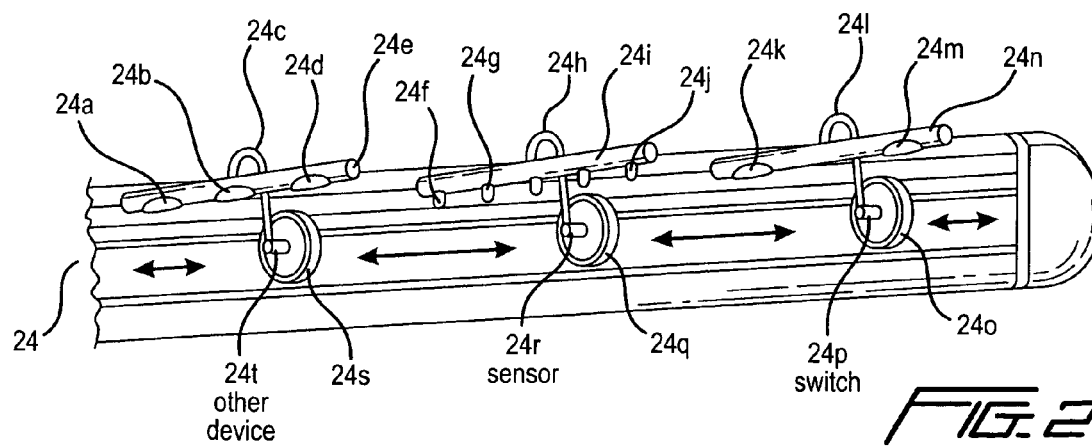
FIG.24

REMOVABLE LED LIGHT DEVICE

BACKGROUND OF THE INVENTION

This application has subject matter in common with U.S. patent application Ser. Nos. 12/073,889 ("LED track light device"); 12/073,095 ("LED light with changeable position with Preferable power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/527,631 ("LED Night light with interchangeable display unit"); 11/498,881 ("Poly Night light"); 11/255,981 ("Multiple light source Night Light"); 11/094,215 ("LED Night light with Liquid optics medium"); 11/092,741 ("Night light with fiber optics); 10/883,747 ("Fiber Optic light kits for footwear"); 11/498,874 ("Area Illumination for LED night light") 11/527,628 ("Time Piece with LED night light"); 11/527,628 ("Multiple Function Night light with Air Freshener"); 11/806,284 ("LED Night light with more than one optics mediums"); 11/806,285 ("LED Night Light with multiple function"); and 11/806,711 ("Multiple LEDs Light with adjustable angle function").

The current invention is related to a removable LED light device made up of a plurality of LED-Units situated within a track means such that the LED-Units can change position along the track means when people move the said LED-units.

The current invention has a simpler construction than the lighting devices disclosed in copending application Ser. Nos. 12/007,076, 12/003,809, 11/806,711, 11/806,285, 11/806,284, 11/527,628, 11/527,629, 11/498,874, 11/527,631, 11/498,881, 11/255,981, 11/184,771, 11/152,063, 11/094,215, 11/092,742, and 11/092,741, listed above.

The current invention also is related to a removable LED light device having track means with bus-means to electric signals from a power source and change the power source electric signals using circuit means to trigger the LED-unit's LED or LEDs for desired light performance. Each said LED-unit has a desired LED or LEDs that fit into the LED-unit along with conductive means, resilient conductive means, and contact-means to obtain moveable LED-units that can freely move within the track means and are always connected with the bus-means to deliver the electric signals to the LED or LEDs.

The current track light device has the following 10 features that are also included in the light device of co-pending application Ser. No. 12/073,889 10 features, as well as 14 additional features listed below.

The original 10 features are:
1. The light device includes easy-to-replace LED-units.
2. A user can add or reduce the LED-units at any time.
3. A user can easily replace batteries when using a DC power source.
4. A user can easily plug the electric plug into a wall outlet adaptor when using an AC power source.
5. The track means has space to arrange the DC or AC power source and related parts neatly in a compartment.
6. The LED-units may optionally incorporate rotating means to enable the light beams to be adjusted over an angle of 360 degrees (as also disclosed in co-pending application Ser. No. 11/806,711 and other related copending applications listed above)
7. The LED-units may optionally incorporate hanging means to add more practicality and value to the current invention, the hanging means optionally also having an adjustable angle for different installations.
8. The circuit means may incorporate an Integrated Circuit to provide desired light functions currently available on the market or to incorporate sensor means, motion sensor means, photo sensor means, and/or mechanical or electric switch means to make the LED light device more practical and improve the life of the consumer.
9. The material of the track means material may be selected from a bendable, cuttable material so as to allow a consumer to be make the track means shorter to fit into a limited space.
10. All LED-units may be arranged in-parallel to facilitate adding or reducing the desired number of LED-units because the LED's element power consumption is very low and there is therefore no need, unlike the case of a halogen bulb, for each unit to carry its own circuit and transformer, which is way too risky since the unit may fall off and kill people from a high location—the LED track light can use a bus means with an LED trigger current which is a safe and low current and voltage so that there will be no harm to people.

The current invention additionally adds the following features:
11. The bus-means can be designed to provide a super compact track means and incorporate a super small or miniature LED light unit to allow people to apply the current invention to a tiny space or area.
12. The light device can have an outer groove to add a joint-piece having a geometric shape that enables a plurality of the LED track light devices to be put together to form a unit having a desired length, shape, and size to fit into a certain space, and the joint-piece can connect the plurality of LED track light devices into linear, curved, vertical, L-turn, Y-turn, or any other desired geometric configuration.
13. The LED light unit can have different designs for contact-means with desired mechanical construction to allow people to easily add or remove the said LED light units from the ends or from any position of the track means.
14. The each LED light unit can have different constructions to install a desired number of the LED elements, contact means and related parts to enable the said LED light unit(s) to be easily removed from and added into the track means.
15. The track light device may have a plurality of switch or sensor means to allow people to turn on a desired number of the LED light units—for example, the whole system can have one central switch and sensor means to turn on and off the system under pre-determined conditions or each LED light unit or group of LED light unit(s) can individually have additional switch or sensor means that can turn on and off the light unit or group of the LED light unit(s) according to a user's desire.
16. The LED light unit(s) can fit within the track light device from ends or anywhere along the track means.
17. The LED light unit(s) can have a base that fits within the track means and has a desired geometric design in which the LED element(s) and related parts and accessories arranged into a matrix, line, or any other arrangement and number of LED elements located in three dimensions on top of the said LED light unit's base.
18. The bus-means and track means can be any geometric shape as long as the distance to fit the said LED light unit(s) is the same.
19. The LED elements may be installed on a desired surface incorporated with a bar, tube, flexible tube, or bendable tube to allow the LED elements' light beam to be seen in desired areas.
20. The LED elements, LED light unit, bus means, track means, and/or light device can be any size to fit into different locations and spaces such as in a kitchen, bed room, laundry room, toilet, garage, patio, garden, living room, bus, car, airplane, boat, airport, hospital, restaurant. The size can be enlarged to any size, and can also be reduced to a desired miniature size for small area illumination.

21. The power source, batteries, AC adaptor, AC plug and related accessories can be designed to fit into a desired compartment which may be anywhere in the said track light device or LED light device as required, for example at two ends or in the back of the track light device or removable LED light device.

22. The bus means can be arranged anywhere on the track light or removable LED light device.

23. The said LED track light or removable LED light device can be designed as a picture frame light to offer a light and hanging device for all restaurants to use.

24. The LED track light or removable LED light device may be arranged to form a super strong hanging device that can support a desired weight with differing hook lengths and hook location.

All the 10 features originally described in co-pending applications and the 14 features described herein can make a big improvement in a consumer's life and become a universal LED light device for people to use in their house, kitchen, under cabinet, bath room, garage, wash room, closet, stair, front door, garden, swimming pool, spa, patio, public area, stair, bus, van, car, boat, or airplane, or any place that needs a good light fixture with super low power consumption, or green energy-saving light fixtures.

The current track light device has the following preferred construction.

At least one of LED-units is a arranged within a track means with position, location changeable features.

The LED-units have a geometric design, shape, and construction to fit within the track means and allow light to be emitted in a desired direction for area illumination.

At least one LED element fits within the LED-unit and the element's electric terminals connect with conductive means, resilient conductive means, contact-means, and bus means to deliver electric signals from a preferred power source and circuit means to the poles.

The afore-said construction further may include the following improvements:

At least one pair of bus-means are arranged within the track means to deliver electric signals from a power source and circuit means to the element's poles for illumination exhibiting a predetermined function, duration, brightness, colors, and/or performance.

The track means has a geometric shape, design, and dimensions to provide space to arrange the power source, circuit means, bus means, and related parts to supply the electric signal from an alternating current (AC) or direct current (DC) source.

The track light device can be installed on a main object's surface by conventionally available attachment means.

The LED-units may include optional rotating means to adjust each light beam to emit in a desired direction for area illumination.

The LED-units or track light device may be incorporated with hanging means to add other functions.

The current invention may further have wider application to encompass different light means including an incandescent bulb, fluorescent lamp, halogen bulb, electro-luminescent elements, cold cathode tube, and any other conventional light means available from the marketplace which has the same function or equivalent functions as the LEDs or LED-units to offer illumination to all people, with geometric shape, size, and dimension changeable features the orientation, position, etc. of each said light means to be changed.

BRIEF DESCRIPTION OF THE DRAWINGS

FIG. 1 shows a first preferred embodiment of a removable LED light device with a plurality of the LED-units arranged along a track means to contact a bus means, and in which each LED-units' position and light emitting direction can be changed relative to those of other LEDs and with respect to a power pack on the back of the light device.

FIGS. 2, 4, 7, 9, and 19 show the preferred embodiment of a removable LED light device with details of an LED unit, hook, base, conductive means, power pack knob, power pack location and method of assembly into a light device.

FIGS. 3 and 5 show a second preferred embodiment with details of its construction to make the LED-units connect with a bus-means through contact-points and of the electric connection arrangement when the bus means is inside the groove of the outer surface of the light device.

FIG. 6 shows a third preferred embodiment with different LED light means and its own power pack installed on the two track means and assembled by joint-means to become a longer removable LED light device with different designs, construction, shape, and function of the LED light units, and in which the angle, length, position, and orientation of the LED element may be adjusted to provide a desired area with illumination.

FIG. 20 shows a fourth preferred embodiment of a removable LED light device with bus means on the outer surface of the removable LED light device to provide a super compact size of track means—only 10×10 mm or smaller with miniature bracket means to adjust to any angle and fit into tiny window shelves of a glass display box.

FIGS. 21, 22, and 23 show a preferred embodiment of a different construction of the LED light units to fit into track means with a flexible, extendable, or bendable tube, hose, pipe, stick, bar, or rod away from the LED light unit's base with different LED elements arranged on the other end of the LED light unit's base.

FIG. 24 shows a fifth preferred embodiment of a removable LED light device having a plurality of LED light units, the bases of which fit into the track means and have a picture or photo light design illuminate a plurality of pictures picture or photos on a wall at one time so as to provide a bar, restaurant, or house with a good and simple light device for illumination.

FIGS. 25, 26, 27, and 28 show a curved shape removable LED light device having track means that may have any desired geometric shape as long as the bus means distance (d1) (d2) (d3) at every place is the same to enable each LED light units' base to fit into the track and conduct to LED(s) in the LED light unit.

DETAILED DESCRIPTION OF THE PREFERRED EMBODIMENTS

As shown in FIG. 1, the removable LED light device of a first preferred embodiment may be installed on a wall surface by conventional attachment means. The LED light device has an elongate shape and includes track means (1a) and two end-cover pieces (not shown) on each end. A plurality of LED light-units (1b) are securely installed within the track means (1a) and arranged such that the position and/or location of the LED light-units can easily be changed. An appropriate switch means, sensor means, motion sensor, photo sensor, electric or mechanical switch may be added to the LED light device to control electric signals for system control, or added to individual LED light-units for individual control so as to can drive the LED light-units to provide desired illumination exhibiting a predetermined function, duration, timing, color, and/or brightness.

Each LED light-unit may have hanging means (1c) attached to the LED light-unit (1b), the angle of which can be adjusted and maintain to enable other devices enable other devices to be hung with blocking the light beam.

Figure 7:
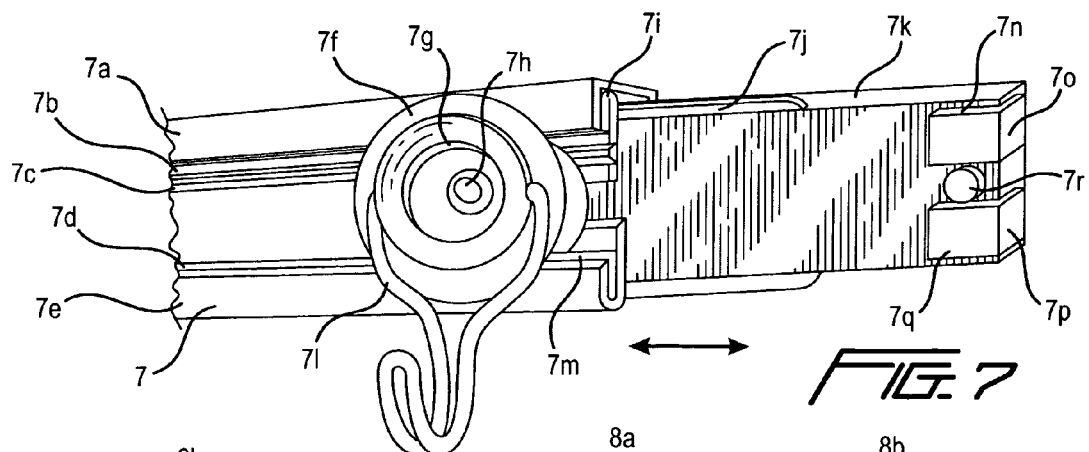
Figure 9:
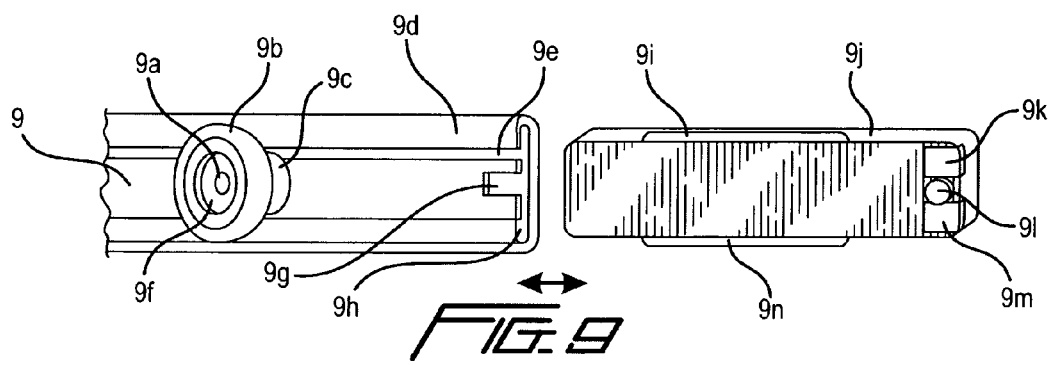

Each LED light-unit (1b) may have reflector means (1f) to make the inner LED element (1g) get better photometric light effects. The LED light-unit's base (1d) may have a different construction with desired contact-means to allow the base (91d) to fit into the track means (1a) from ends or anywhere along the track means and to be added on or removed from the track means (1a) easily at any time. At least two of the bus means (1j) (1k) are isolated by each other and fit within any location of the track means (1a) to connect with the LED light-unit's base contact means (not shown) to get electric signals for illumination under pre-determined light functions. The power pack has a knob (1i) to allow people to easily take out and re-insert a battery for replacement. The two conductive means (1h) (1j) provide an electric connection from the bus means to the battery power pack. FIGS. 7, 9, and 19 show the same details from a different viewing angle so these drawings do not require further description.

As shown in FIG. 2, a removable LED light device is installed on a main object's surface by double side foam tape, or screw, nail, or hook means, and includes an LED light-unit (2d) to fit within the track means (2c) and two end-covers (not shown) on each end. Each of LED light-units (2c) has an LED element (not shown) arranged with a reflector means (2f) to make the light beam have better photometric performance, the reflector means (2f) also offering a rotating angle of 360 degree and tilt to a predetermined angle function for manual adjustment of the reflector means. This features of an adjustable reflector is also disclosed in copending application Ser. Nos. 11/806,711, 12/003,809, and 12/007,076. The hanging means (2g) on this embodiment are vertical with respect to the track means but the hanging means have adjustable angle features.

As shown in FIG. 2, the removable LED light device has space to arrange a power source (2h). The power source (2h) can be (A) a DC power source in the form of the batteries, or (B) an alternating current power source in the form of an electric plug and cord connected with the wall outlet power. Both power sources may be incorporated with sensor means, switch means, a motion sensor, timer, and/or electric or mechanical switch means to drive the removable LED light device for illumination. It will be appreciated that the battery can be powered by solar power, wind power, or a generator to provide an energy saving device and not be limited to a battery only. Further, the sensor means, switch means, motion sensor, timer, electric or mechanical switch means also can be added on an individual LED light-unit to provide individual control of the LED light-unit or a group of the LED light-units. If the power source (2h) is battery power pack it preferably has a knob (2n) to allow people to easily remove the battery pack from the track means (2b). The power pack (2h) has two input-ends (2i)(2k) with conductive means (2m)(2l) to make electric connection with bus means at points (2p) (2o) to deliver electric signals from the power pack (2h) to the bus means (2p) (2o) and supply electric signals to the LED light-unit's base (2e).

As shown in FIG. 3, the removable LED light device (3c) may be installed under a cabinet of a kitchen or wash room. The light device has four LED light-units that fit within the said track means and have contact means (3b) that connect with bus means (3a) on the outer surface of the track means. Each of the LED light-units has an LED element (3g) (3h) (3f) (3e) incorporated with reflector means (not shown) and preferred rotating means (not shown) to allow the reflector means to rotate and tilt to different angles. This feature is also disclosed in co-pending U.S. patent application Ser. Nos. 11/806,711 and 12/003,809 and 12/007,076, and therefore details are not described further herein.

The hanging means (3d) of this embodiment are vertical to the track means but adjustable and can have different lengths, shapes, and sizes.

As shown in FIG. 4, removable LED light device has track means (4a) with an elongate shape to provide space to arrange a power source (4f) having circuit means (not shown) and batteries (not shown) within, and conductive means (4h) (4i) to connect with the bus means when the power source (4f) is put into the space so that the removable LED light device can supply an electric signal deliver from the batteries to the bus means. Each of the bus means is separated by the isolating wall (4e) to make sure there is no risk of an electric short. The bus means includes a pair of conductors that provide (+) and (−) electric signals for this preferred embodiment. It will be appreciated that for some applications, the bus means may have a greater number of conductors, such as three, (+) and one common (−) line in order to drive a multiple colors LED chip or three LEDs. The device also can include more of the bus means, such as 6 sets of three (+) and one common (−) to drive six groups of multiple colors LEDs or six groups of three LEDs. This depend on the desired number of LEDs and the functions needed, light device including as many bus means as required for the said LED track light device.

All LED-units are arranged in-parallel so that the user can add-on or remove a number of the LED light-units. This is possible because LED element power consumption is very low, so there is no need, as in a halogen bulb lighting system, for each unit need carry its own circuit and transformer, which is way too risky since the light unit could fall off and kill people from high location. The LED track light can use the bus means with an LED trigger current which is a safe and low current and voltage so there will be no harm to people. The low consumption also allows a parallel electric connection arrangement to be used. An important issue is that the LED light unit's base (4c) also needs to have a polarized design against the isolated-wall (4e), so as to prevent incorrect installation of the LED light-units into the track means, which could cause an electric short circuit that will burn out the LED elements.

As shown in FIG. 5, the buss means (5a) on the outer surface of the track means and the LED light-unit's base contact means (5b) are connected with the bus means. This arrangement provides a super compact design of the removable LED light device.

As shown in FIG. 6, one of joint-means (6f) makes electric connection between two pieces of the removable LED light devices. The left set of the removable LED light device has an individually power source arrangement inside the compartment (6a) (6b) (6r) (6v) (6c) (6d) (6e) with a preferred LED light-unit design (6p) (6q) (6s) (6u) (6w) (6y) (6z) utilizing desired bracket means (6t) (6x) (6aa) to determine the LED element location, position, and orientation and enable the LED light beam hit the right area. The right set of the removable LED light device has a preferred power source arrangement inside the compartment (6g) (6h) (6i) (6k) (6l) (6m) with a preferred LED light-unit design (6bb) (6cc) (6ee) (6ff) (66ii) (6kk) (6ll) having desired bracket means (6dd) (6gg) (6hh) (6jj) to determine the LED element location, position, and orientation and enable the LED light beam to hit the right area.

The bracket means enables the LED elements arrangement to be far away from the LED light-unit's base so that the LED light beam can hit on the desire area. This is very important to allow the removable LED light device not only to have a position change but also to have the best adjustment function to cause LED light beams hit a target.

Figure 8:
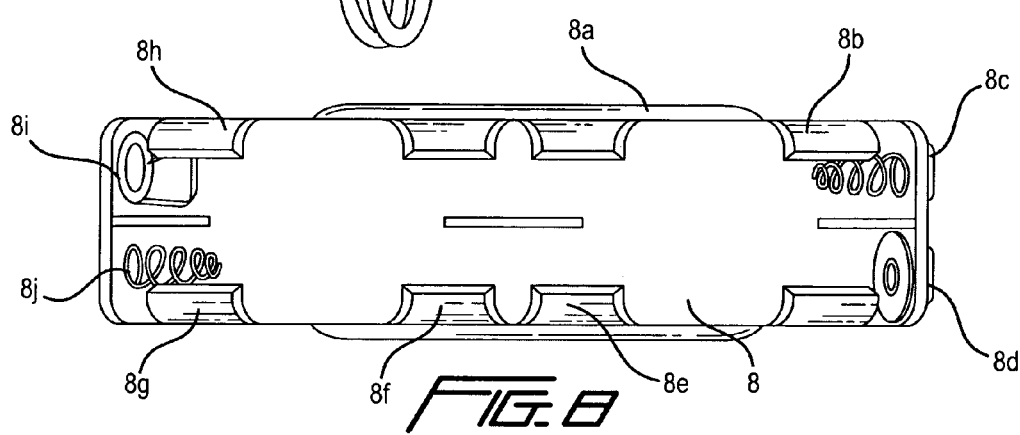
FIG. 8 the first preferred embodiment with details of the construction of a direct current power source in the form of a battery power pack.

As shown in FIG. 8, the power source (8) may in the form of a direct current source as discussed above. When the power source (8) uses direct current, a battery may be the power source. The batter can be a regular battery or rechargeable battery with a charging system connected to a solar, wind, or chemical power source. FIG. 8 shows a preferred embodiment which uses a plurality of batteries inside the power pack having a case wall (8b) (8h) (8g) (8f) (8e) with edges (8a) to allow the power pack tightly fit within the space. Each battery can be fit within the terminal (8i) (8c) and (8j) (8d) and isolated by the walls. The output ends (+) (−) have conductive means to allow the power pack to deliver electric signals to the bus means.

Figure 10:
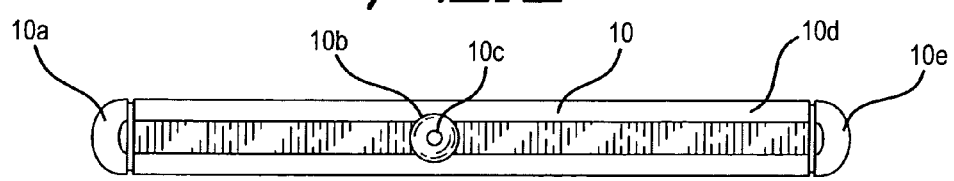
FIGS. 10 and 11 shows the first preferred embodiment with construction of a switch and sensor means for the whole system and individual LED light unit(s) or a group of the LED light units controlled by the switch or sensor means.
Figure 11:

As shown in FIG. 10, a system switch or sensor means can be installed at a center location of the removable LED light device so provide system control and cause the LED light-units to turn on under predetermined functions. As shown in FIG. 11, the system control means can also be arranged at other locations (11e) to provide system electric control. It will be appreciated that the switch or sensor means also can situated on an individual LED light-unit(s) to provide individual electric control for individual LED light-units, for example, to turn on or off the individual LED light-unit(s) when the system control is on. It is also to be appreciated that the electric control also can incorporate an Integrated Circuit (IC) to enable all LED light-units to exhibit sequential, chasing, random, pair flashing, and other conventional LED light effects with appropriate bus means that still fall within the current invention's scope.

Figure 12:
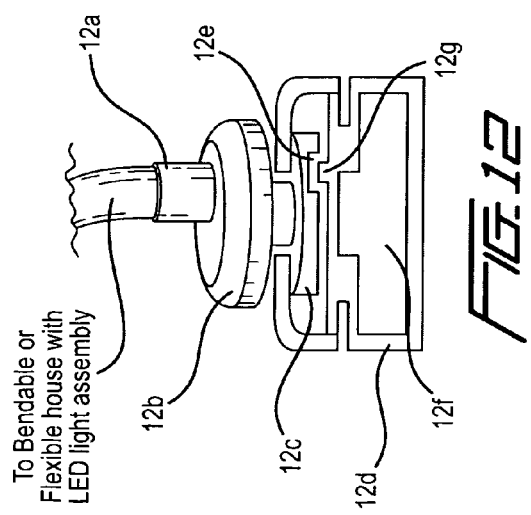

As shown in FIG. 12, the LED light-unit may be caused to have a different design, construction, details, and function by associating the base with a different top bracket means arrangement. In the embodiment of FIG. 12, the bracket means (12a) is connected with the LED light-unit base (12b). The preferred embodiment which has LED light-unit base (12b) has a neck construction (12c) to allow the LED light-unit base to fit within the track means (12d). The LED light-unit base (12b) has an opening (12e) to receive an isolation-wall (12g) to ensure that the LED light-unit is installed with correct electric polarization to prevent electric short circuits that can damage the LED elements. The bracket means (12a) can have a different construction to incorporate different bracket means selected from the group consisting of a bendable, flexible, extendable, retractable, or foldable tube, pipe, bar, stick, rod, or other bracket means to enable the LED elements to emit a light beam that hits a desired area.

Figure 13:
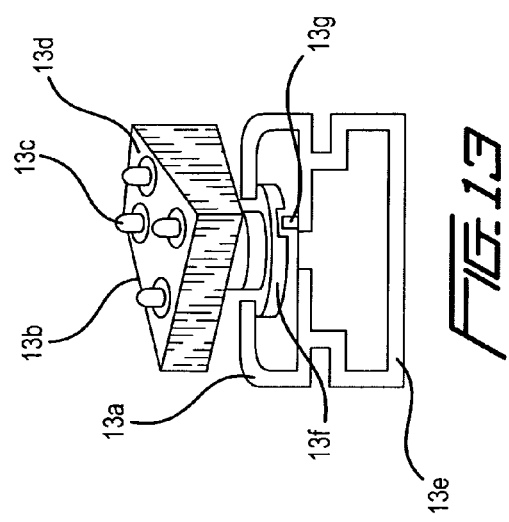

As shown in FIG. 13, the LED light-unit has one of the preferred LED elements on top of the LED light-unit base. The LED light-unit base (13f) has an opening (not shown) to fit the isolation-wall (13g). The LED light-unit base (13f) has a substrate (13b) to install a plurality of LED elements (13c).

Figure 14:
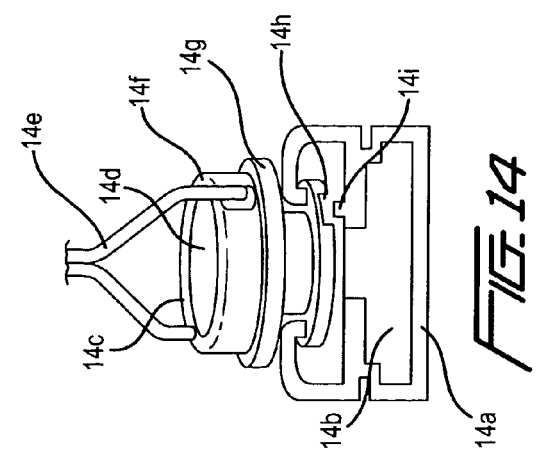
FIGS. 12, 13, 14 show the first preferred embodiment with details of the construction of the LED-units which can have different construction, design, and shape to arrange the LED elements close to the LED light unit's base or away from the LED light unit's base when incorporated with a bendable, flexible, extendable, retractable, or foldable tube, pipe, bar, stick, or rod to enable the LED elements to emit light that hit a desired area.

As shown in FIG. 14, LED light-unit (14c) has a center concave space (14d) to install LED elements (not shown). The LED light-unit base has an opening (14h) to fit an isolation-wall (14i) to ensure the correct electric polarization.

Figure 15:
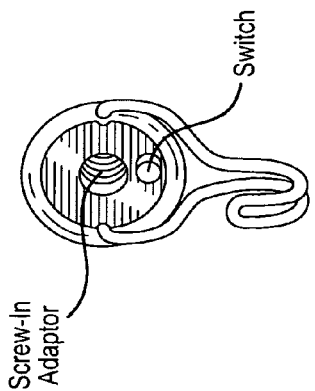

As shown in FIG. 15, the LED light-unit base may have a screw-in adaptor to allow installation of a screw-in bracket means and complete the electric connection from the LED light base to the LED elements assembly. The LED light-unit has its own switch and sensor means to cause the individual LED light-units to be turned on according to a pre-determined function(s).

Figure 16:
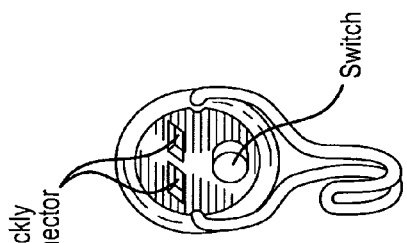

As shown in FIG. 16, the LED light-unit base has a quick— connect adaptor, s switch, and sensor means to provide the LED light-units with a desired construction, shape, and functions by the bracket means and LED elements assembly.

Figure 17:
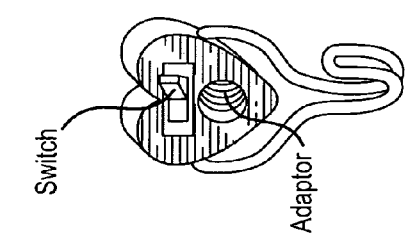

As shown in FIG. 17, LED light-unit base may have aw heart shape with a toggle switch and adaptor to connect with the bracket means and LED elements assembly to provide a desired LED light-unit.

Figure 18:
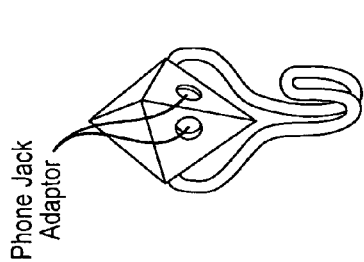
FIGS. 15, and 16, 17, and 18 show a base construction of an LED light unit' of the first preferred embodiment, arranged to fit a bendable, flexible, extendable, retractable, foldable tube, pipe, bar, stick, rod by a screw-in, snap-in, quick-connect, or phone jack adaptor to provide a different construction of the LED elements and control, by a desired switch or sensor means on an individual light unit or the whole system, the light beams emitted by the LED elements to illuminate a desired area.

As shown in FIG. 18, the LED light-unit base may have a geometric shape with a phone jack adaptor to easily connect with the bracket means and LED element assembly.

As shown in FIG. 19, the track means (19) may have a telephone type opening (19b) to provide solid attachment on a wall by a screw in addition to double side foam tape.

As shown in FIG. 20, the removable LED light device may have track means (20) including two bus means (20a) (20b) located on the outside of the track means (20) and the LED light-unit may have a light element assembly (201) including a base (20g) (20j) and two contact means (20c) (20d) to connect with the bus means (20a) (20b). The two securing screws (20e) (20f) can be used to make sure the contact means (20c)(20d) tightly electrically connect with the bus means (20a) (20b). The angle adjustable screws (20h) (20k) can be used to adjust the angle of the LED element assembly (20l) to any desire angle.

This embodiment shows that the bus means can be designed on the outside of the track means to ensure a compact size of the track means. The LED light-unit can have a desired shape, construction, base, contact point, and insulation which are not limited to the illustrated LED light-unit base with neck design to fit the LED light-unit from the two ends of track means. In this embodiment, the LED light-unit may include an LED element assembly (20*l*) which has a different metal plate contact point (20*c*) 920*d*) so that it can be clipped on the bus means (not neck design) from anywhere along the length of the track means (20) (and not just from the two ends).

As shown in FIG. 21, a preferred LED light-unit (21*f*) embodiment incorporates a bendable, flexible, extendable, retractable, or foldable tube (21*c*), pipe, bar, stick, rod, or other bracket means to install the LED element assembly (21*a*) on top of the LED light-unit base (21*f*) so that an emitted light beam can hit a desired area. The LED element (21*a*) may be situated inside a lamp shade (21*b*) with an individual switch and sensor means (21*g*) to make the LED element turn on under predetermined conditions.

As shown in FIG. 22, another preferred LED light-unit (22*b*) embodiment incorporates a bendable, flexible, extendable, retractable, or foldable tube (22), pipe, bar, stick, rod, or other bracket means to install the LED element assembly (22*e*) on top of the LED light-unit base (22*b*) so that an emitted light beam can hit a desired area. The LED element (22*e*) inside the brass picture lamp shade may be provided with an individual switch and sensor means (22*a*) to make the LED element turn on under predetermined conditions.

As shown in FIG. 23, yet another preferred LED light-unit (23*e*) embodiment incorporates a bendable, flexible, extendable, retractable, or foldable tube (23*d*), pipe, bar, stick, rod, or other bracket means to install the LED element assembly (23*c*) on top of the LED light-unit base (23*e*) so that the emitted light beam will hit a desired area. The LED element (23*b*) is situated inside an opaque plastic shade with an individual switch and sensor means (23*h*) to make the LED element (23*b*) turn on under predetermined conditions.

As shown in FIG. 24, a preferred removable LED light device (24) has a plurality of LED light-units (24*s*) (24*q*) (24*o*) that incorporate a bendable, flexible, extendable, retractable, or foldable tube (24*c*), pipe (24*h*), bar (24*l*), stick, rod, or other bracket means to install the said LED element assembly (24*a*) (24*b*) (24*d*) (24*g*) (24*i*) (24*j*) (24*k*) (24*m*) on top of the LED light-unit base (24*s*) (24*q*) (24*o*) so that an emitted light beam will hit a desired area. The LED element is situated inside a brass, opaque, or glass lamp shade with an individually switch and sensor means (24*t*) (24*r*) (24*p*) to make the LED element (24*a*) (24*b*) (24*d*) (24*g*) (24*i*) (24*j*) (24*k*) (24*m*) turn on under predetermined conditions.

Figure 25:
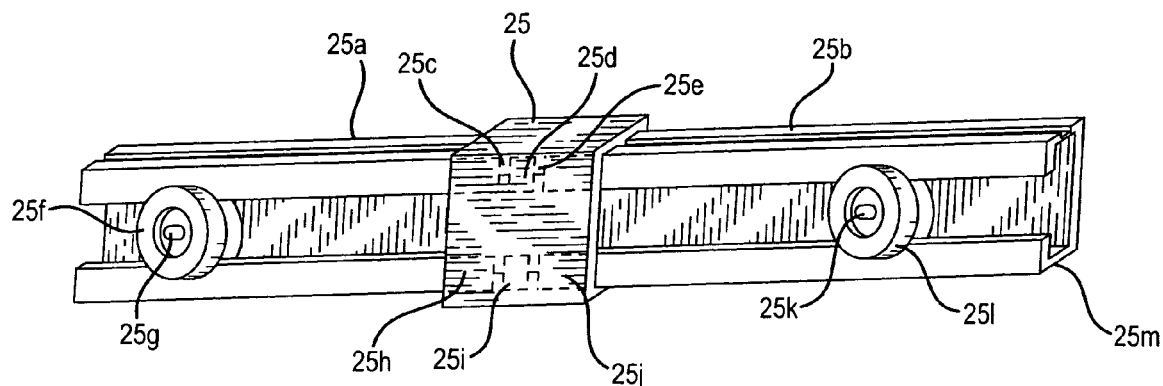
FIGS. 25, 26, and 27 details of a construction that enables a plurality of removable LED light device(s) connected by joint-means to be assembled into linear, L-Shape, Y-Shape, or any other geometric combination depending on the design and construction of the joint-means.

As shown in FIG. 25, two or more pieces of the removable LED light device (25*a*) (25*b*) may be connected by joint-means (25) which are well installed within a groove on the outside of the track means. Each of the removable LED light devices (25*a*) (25*b*) may have its own power source (not shown). Alternatively each of the removable LED light devices (25*a*) (25*b*) may use a common power source (not shown) and have a first joint-compartment (25*d*) to supply electricity from bus means (25*c*) and (25*e*) and a second joint-compartment (25*i*) to supply electricity from bus means (25*h*) and (25*j*). If the LED element assembly has multiple color, multiple light functions with chasing, sequential or other functions which need more than two electrodes, then more bus means need to be provided by adding joint-compartments to complete the electric signal delivery between the different removable LED light devices.

Figure 26:
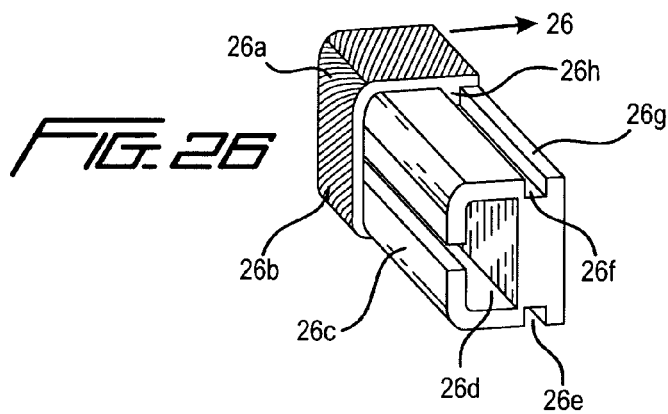

As shown in FIG. 26, the removable LED light device (26*c*) has a groove (26*f*) on an outside of the track means (26*c*). The joint-means (26*a*) has teeth means (26*h*) to fit into the groove (26*f*) so as to easily fit into the groove and move freely along the track means (26*c*) to join different track means in desired combinations.

Figure 27:
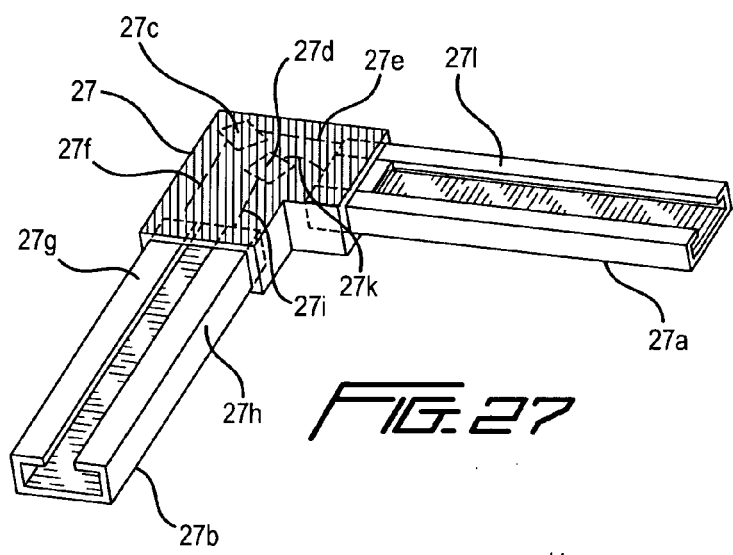

As shown in FIG. 27, the removable LED light device (27) includes an "L" shaped joint to join two of the removable LED light devices. Two of the joint-compartments (27*c*) (27*d*) connect with the bus means (27*f*) (27*e*) (27*i*) (27*k*) to complete an electric connection between the two removable LED light devices.

It will be appreciated that the joint piece may alternatively have a Y-Shape, X-shape, Cross-Shape, V-Shape, W-Shape, F-Shape, H-Shape, I-Shape, K-Shape, L-Shape, M-Shape, or other geometric shapes available from a conventional piping system and still fall within the scope of the current invention.

Figure 28:
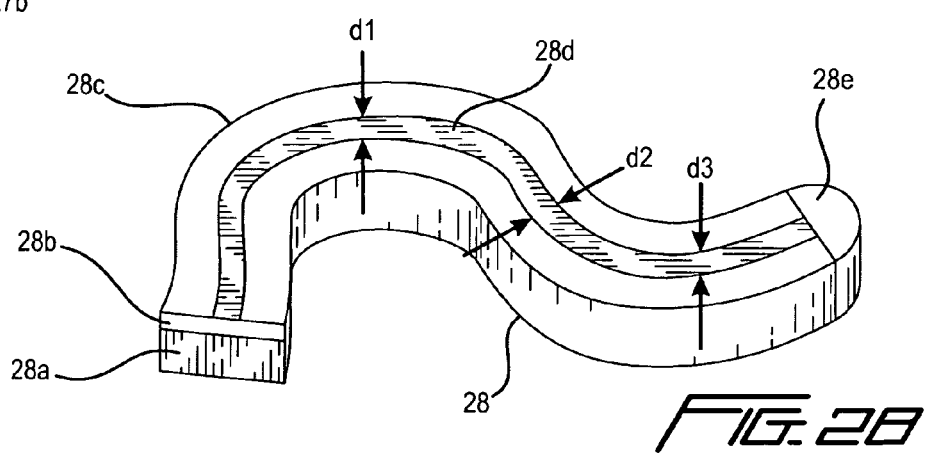

As shown in FIG. 28, the removable LED light device includes a geometric curved shape having the same distance (d1) (d2) (d3) of the bus means anywhere along the track means so the LED light-unit base can fit into the track means.

Figure 29:
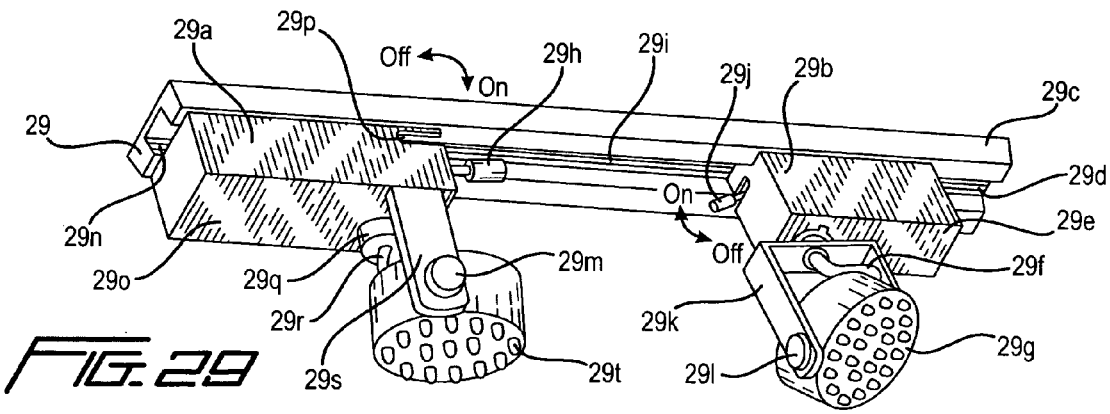
FIGS. 29, 30, 31, 32, and FIG. 33 show a different construction and design of the LED light unit's base to fit the bus means of the removable LED light device, the LED light unit's base having twistable, elastic, resilient, flexible contact-means that can be deformed to ensure an electric connection.

As shown in FIG. 29, the removable LED light device (29) includes a conventional LED light-unit (29*a*) (29*b*) with conventional twisted contact means (29*h*) (29*j*) to fit into the trace means (29*c*). The LED light-unit (29*a*) of this embodiment fits into the trace means (29*c*) and connects with the bus means (29*n*) (29*i*) while the twist-bars (29*h*) are twisted from "Off" to "On" so the narrow-area of contact means will move 90 provide a wider-area of the contact means (29*h*) to fit within the track means (29*c*) and complete electric connection between the light-unit to bus means. The twist-bar (29*h*) is twisted to the "ON" position so as to be tightly electrically connected with the bus means.

To move or remove the LED light-unit (29*a*) from track means (29*c*), the user just needs to twist the twist-bar (29*h*) from the "On" position to the "Off" position, so the contact means will turn 90 degrees and move the wider-area 90 degrees and let the narrow-area within the track means be moved or removed from the track means.

Figure 30:
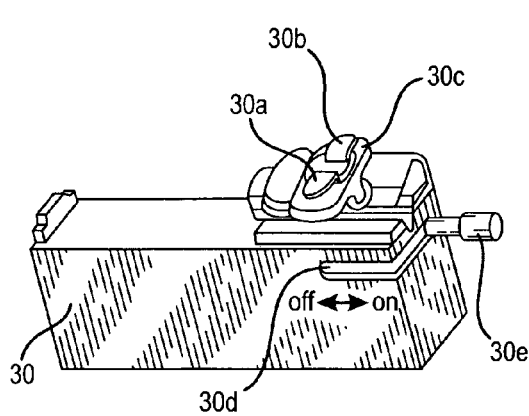
Figure 31:
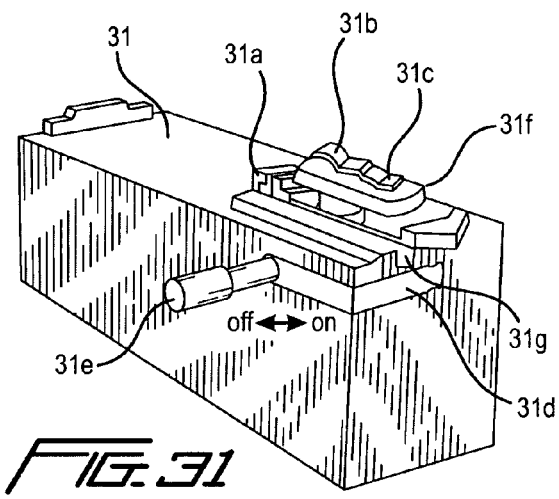
Figure 32:
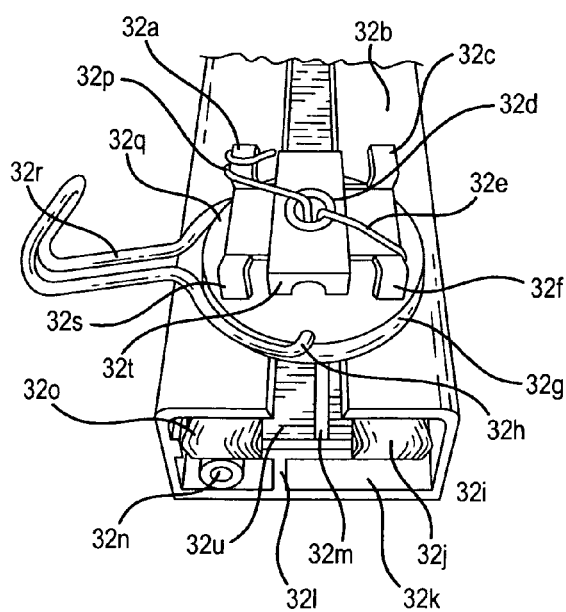

The LED light-unit (29*a*) (29*b*) has a desired design of the base (29*o*) (29*e*) with LED element assembly (29*t*) (29*g*) to meet different market requirements. The light unit ca include a single LED or a plurality of LEDs in dot, linear, surface, or dot-matrix arrangements with desired color, brightness, functions, and/or effects. Each of the LED element assemblies (29*t*) (29*g*) has accessories (29*m*) (29*l*) to provide an angle adjustment. Each LED elements assembly also has accessories (29*s*) (29K) (29*f*) to provide an installation and swivel function, and accessories (29*r*) to complete an electricity delivery path from the base to the LED element assembly, FIGS. 30 and 31 show details of a design for the relation between the contact point (30*c*) (31*f*) and twist-bar (30*e*) (31*e*).

When the twist-bar (30*e*) is twisted to an "ON" position, the wider-area of the contact means (30*c*) will fit into the track means to enable electricity delivery between the bus means (not shown) and contact means (30*a*) (30*b*) for a two electric signals system. The two contact means (30*a*) (30*b*) still need to be made by resilient conductive means in order to ensure good electric connection to the bus means without any bad electric connection.

When the twist-bar (31*e*) is twisted to the "OFF" position, the narrow-area of the contact means (31*f*) will fit into the track means to disconnect electricity delivery between the bus means (not shown) and contact means (31*b*) (31*c*) for a two electric signals system. The two contact means (31*b*) (31*c*) still need to be made by resilient conductive means so as to provide a good electric connection to the bus means without any bad electric connection.

FIGS. (29) (30) (31) teach a different LED light-unit with different base construction (neck, twist, snap, clip or equivalent method) and different contact means (push on-off, twisted on-off, screw tight-loosen, clip tight-loosen, pin through, or other equivalent method) which still falls within the current invention of a removable LED light device.

FIG. (32) shows other alternative LED light-unit base and contact means arrangements. The LED light-unit has a base (32g) with resilient metal contact means (32a) (32c) (32f) (32s) that are bent or curved to make a smooth movement within the bus means (32o) (32j). The LED element (32d) has two electrodes (32p) (32e) that are coiled on the metal contact means (32a) (32f) to complete the electric connection from the bus means to metal contact means to the electrodes of the LED elements. The LED base has hanging means (32r) installed on the hole (32h). This embodiment is an example of another design for LED light-unit base with different contact means and LED element assembly.

Figure 33:
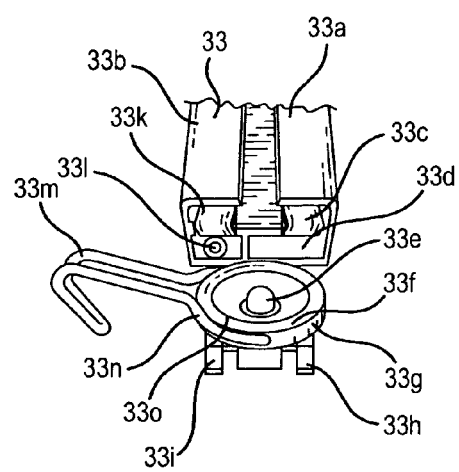

As shown in FIG. 33, the track means (933) has bus means (33k) (33d) to make electric connection with the LED light-unit base through the contact means (32i) (32h) to deliver electricity from the bus means (33c) (33k) to the contact means (33h) (33i) and the LED element assembly electrodes (33f) (33o) to enable the LED element assembly (33e) to provide illumination. This kind of metal contact means (32i) (32h) is alternative to the contact means described above and still falls within the scope of the current invention.

While the above-discussed and mentioned preferred embodiments show the scope of the current invention, it is to be appreciated that any alternative or equivalent functions, design, construction, modification, and/or upgrade will still fall within the scope of the invention, which is not limited to all of the above-discussed and mentioned details. Any alternative or equivalent arrangement, process, installation or other changes from the current invention may still fall within the scope of the current invention, including changes in the power source, conductive means, geometric shape of the LED-units, joint-means, circuit means, sensor means, switch means, LED elements, attachment means, fixing-means, tightening means, and/or resilient conductive means.

The invention claimed is:

1. A removable LED light device, comprising:
    at least one LED light unit arranged within track means for supporting and supplying electricity to said LED light unit, said track means having features that enable changing of a position or location of said LED light unit, said LED light unit having a geometric design, shape, and construction that enables it to be positioned within the track means by insertion from an end of the track means; and
    at least one LED element situated within the LED light unit, electrodes of said LED element being connected to conductive means, resilient conductive means, contact means, and bus means for delivering electric signals from a power source and circuit means to said electrodes,
    wherein
    at least two of said bus means are isolated from each other and arranged within said track means to deliver the electric signals from the power source and circuit means to the electrodes for illumination under predetermined functions, duration, brightness, colors, and performance, said bus means being unreachable within the track means so that they cannot be touched by a user,
    the movable LED light device has a geometric shape, design, and dimensions that provide space to arrange or store the power source, circuit means, bus means, conductive means, contact means, and parts and accessories related to said power source to supply alternating or direct current from said power source,
    the LED track device can be attached to a main object by conventional attachment means,
    said resilient contact means is included in said LED light unit to ensure that electrical contact is maintained with said bus means as said LED light unit is moved anywhere along said track means, and
    the LED light device has an end piece arranged to enable additional LED light devices to be joined to said LED light device or removed from said LED light device, said end piece providing electrical and mechanical joining between LED light device and additional LED light devices.

2. The removable LED light device of claim 1, wherein the bus means are on an outside of the track means to provide a super compact track means to incorporate a super small or miniature LED light unit to fit into a tiny space, area, or room.

3. The removable LED light device of claim 1, wherein the light device has outer groves to add a geometric shape joint piece for connecting a plurality of the LED light devices together and form a combined light device having a desired length, shape, and size to fit into a certain space, the joint piece connecting the plurality of LED light devices to form a linear, curved, vertical, L-turn, Y-turn, or other non-linear geometric shape.

4. The removable LED light device of claim 1, wherein different contact means are arranged to facilitate adding or removal of an LED light unit from any position, rather than just the ends, of the LED light unit in said removable LED light device.

5. The removable LED light device of claim 1, wherein multiple said LED light units have a different construction, function, features, design, and purpose with a desired number of LED elements, the contact means and related parts facilitating removal and addition of the different LED light units to or from the LED light device.

6. The removable LED light device of claim 1, wherein the light device and light unit has a plurality of switch and sensor means to turn on and off desired numbers of the LED light units under predetermined conditions.

7. The removable LED light device of claim 1, wherein the LED light unit has a polarization design on a base thereof to ensure that the LED light unit is properly installed from ends or anywhere on the track means with no risk of short circuits.

8. The removable LED light device of claim 1, wherein the LED light unit has a base that fits within the track means and a desired geometric design to arrange the LED elements into a dot, linear, surface, matrix, or other arrangement of LED elements in any or all of three dimensions without limitation to being close to the base.

9. The removable LED light device of claim 1, wherein said bus means and track means can be any geometric shape as long as the dimensions accommodate a base of the LED light unit.

10. The removable LED light device of claim 1, wherein the LED elements are installed on a desired substrate and incorporate a bar, tube, flexible tube, bendable tube, shaped rack, or other bracket means for positioning said LED element at a desired position, angle, orientation, and dimension to cause emitted light beams to illuminate desired areas.

11. The removable LED light device of claim 1, wherein the LED elements, LED light unit, bus means, track means, and light device an be any size to fit different rooms, space, or environment selected from the group consisting of a kitchen, bed room, laundry room, toilet, garage, patio, garden, living room, bus, car, airplane, boar, airport, hospital, and restaurant, with the size of ranging from miniature to extra large.

12. The removable LED light device of claim 1, wherein the power source includes batteries, an AC adaptor, an AC plug, and related accessories to fit into a compartment anywhere on the track means or LED light device.

13. The removable LED light device of claim 1, wherein the bus means is arranged to be positioned anywhere on the track means or removable LED light device.

14. The removable LED light device of claim 1, wherein the LED light unit is a picture frame light to provide a light and hanging device or use in restaurants.

15. The removable LED light device of claim 1, wherein the LED light unit or removable LED light device includes a super strong hanging device to support a desired weight with hooks of different lengths, construction, design, and shape.

16. An LED light unit for a removable light device, wherein
said LED light unit has a geometric design, shape, and construction that enables it to fit within the track means anywhere along the track means, and to cause the light beams to be emitted by the LED light unit in desired directions,
said LED light unit includes at least one LED element situated within the LED light unit, electrodes of said LED element being connected to conductive means, resilient conductive means, contact means, and bus means for delivering electric signals from a power source and circuit means to said electrodes, and
said LED light unit has a desired number of resilient conductive said contact means to easily change the LED light unit's position, location, and electric connection with the bus means.

* * * * *